(12) United States Patent
Ji et al.

(10) Patent No.: US 10,961,993 B1
(45) Date of Patent: Mar. 30, 2021

(54) CONTINUOUS HIGH-POWER TURBINE FRACTURING EQUIPMENT

(71) Applicant: AMERICAN JEREH INTERNATIONAL CORPORATION, Houston, TX (US)

(72) Inventors: Xiaolei Ji, Yantai (CN); Rikui Zhang, Yantai (CN); Peng Zhang, Yantai (CN); Chunqiang Lan, Yantai (CN); Zhuqing Mao, Yantai (CN); Jianwei Wang, Yantai (CN); Mingchao Mao, Yantai (CN)

(73) Assignee: American Jereh International Corporation, Houston, TX (US)

( * ) Notice: Subject to any disclaimer, the term of this patent is extended or adjusted under 35 U.S.C. 154(b) by 0 days.

(21) Appl. No.: 16/816,262

(22) Filed: Mar. 12, 2020

(51) Int. Cl.
  *F04B 17/06* (2006.01)
  *E21B 4/02* (2006.01)
  (Continued)

(52) U.S. Cl.
  CPC .............. *F04B 17/06* (2013.01); *E21B 4/003* (2013.01); *E21B 4/02* (2013.01); *F04B 23/06* (2013.01);
  (Continued)

(58) Field of Classification Search
  CPC ... E21B 4/003; E21B 4/02; E21B 7/02; E21B 43/12; E21B 43/26; E21B 43/2605;
  (Continued)

(56) References Cited

U.S. PATENT DOCUMENTS

| 2,350,102 A * | 5/1944 | Fairbanks | ............. F01N 13/085 454/7 |
| 2014/0048268 A1 * | 2/2014 | Chandler | ................ E21B 43/26 166/303 |

(Continued)

FOREIGN PATENT DOCUMENTS

WO  WO-2011048186 A1 *  4/2011  ........... F16D 43/215

*Primary Examiner* — Charles G Freay
*Assistant Examiner* — Chirag Jariwala

(57) ABSTRACT

The present invention discloses a continuous high-power turbine fracturing equipment, including a turbine engine, a reduction gearbox, a and a plunger pump, the turbine engine is arranged coaxially with the reduction gearbox, the reduction gearbox is connected to the plunger pump through the transmission shaft, the angle between a central line of the reduction gearbox and the transmission shaft is between 2° and 4°. The beneficial effects are as follows: chassis T1 materials are selected to provide a stable working platform for the equipment; the turbine engine is arranged coaxially with the reduction gearbox, the transmission shaft is disposed between the reduction gearbox and the plunger pump, and the angle between a central line of the reduction gearbox and the transmission shaft is between 2° and 4°, ensuring stable and efficient transmission of the turbine engine, thus reducing the incidence of failure; a lubrication system driven by an auxiliary power system ensures that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

14 Claims, 2 Drawing Sheets

(51) Int. Cl.
*F16H 57/04* (2010.01)
*E21B 4/00* (2006.01)
*F04B 23/06* (2006.01)
*E21B 7/02* (2006.01)
*F16H 57/02* (2012.01)

(52) U.S. Cl.
CPC ............ *F16H 57/0412* (2013.01); *E21B 7/02* (2013.01); *F16H 2057/02073* (2013.01)

(58) Field of Classification Search
CPC ...... E21B 43/2607; E21B 43/27; F04B 17/00; F04B 17/03; F04B 17/06; F04B 23/00; F04B 23/025; F04B 23/04; F04B 23/06
USPC ............................................................ 454/7
See application file for complete search history.

(56) References Cited

U.S. PATENT DOCUMENTS

| | | | |
|---|---|---|---|
| 2014/0237966 A1* | 8/2014 | Chin | B01D 46/521 55/483 |
| 2016/0177945 A1* | 6/2016 | Byrne | F04B 53/18 184/6 |
| 2016/0369609 A1* | 12/2016 | Morris | F04B 17/06 |
| 2017/0037717 A1* | 2/2017 | Oehring | F04B 53/003 |
| 2018/0298731 A1* | 10/2018 | Bishop | F04B 47/02 |
| 2018/0328157 A1* | 11/2018 | Bishop | E21B 43/26 |
| 2019/0154020 A1* | 5/2019 | Glass | H02P 27/06 |

* cited by examiner

CONTINUOUS HIGH-POWER TURBINE FRACTURING EQUIPMENT

TECHNICAL FIELD

The present invention relates to the technical field of turbine fracturing, and specifically to a continuous high-power turbine fracturing equipment.

BACKGROUND

Traditional fracturing equipment used in oil and gas fields are mainly diesel-driven fracturing equipment and electric-driven fracturing equipment. With the development of science and technology, turbine engines used in aviation have also been applied on fracturing equipment. As the current technologies on turbine engine applications and fracturing operation in oil and gas fields are not mature, it is difficult to realize the stable output of turbine engines, and so far the co-use of turbine engines and high-power plunger pumps is still a blank spot, resulting in low output power of the whole equipment, which cannot meet the current requirements of continuously stable and high-power operations for well sites in oil and gas fields.

Therefore, a continuous high-power output turbine fracturing equipment is urgently needed to satisfy the current demands of well sites in oil and gas fields.

SUMMARY

To overcome the deficiencies in the prior art, an objective of the present invention is to provide a continuous high-power turbine fracturing equipment, in which chassis T1 materials are selected to provide a stable working platform for the equipment; a turbine engine is arranged coaxially with a reduction gearbox, a transmission shaft is disposed between the reduction gearbox and the plunger pump, and the angle between an axis of the reduction gearbox and the transmission shaft is between 2° and 4°, ensuring stable and efficient transmission of the turbine engine, thus reducing the incidence of failure; a lubrication system is driven by an auxiliary power system to ensure that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

The objective of the present invention is achieved by the following technical measures: a continuous high-power turbine fracturing equipment, including a turbine engine, a reduction gearbox, a transmission shaft and a plunger pump, the turbine engine is arranged coaxially with the reduction gearbox, the reduction gearbox is connected to the plunger pump through the transmission shaft, and the angle between an axis of the reduction gearbox and the transmission shaft is between 2° and 4°.

Further, the power of the plunger pump is at least 5000 HP.

Further, the plunger pump is a five-cylinder plunger pump.

Further, the continuous high-power turbine fracturing equipment includes a chassis, the turbine engine, the reduction gearbox, the transmission shaft and the plunger pump are disposed on the chassis, and T1 high strength structure steel is employed as the material of the chassis.

Further, the number of axles of the chassis is 3 or above.

Further, the continuous high-power turbine fracturing equipment includes an auxiliary power system and a lubrication system. The auxiliary power system provides power to the lubrication system, the lubrication system includes a lubrication unit for the turbine engine, a lubrication unit for the reduction gearbox and a lubrication unit for the plunger pump. The lubrication unit for the plunger pump includes a high pressure lubrication unit and a low pressure lubrication unit.

Further, the high pressure lubrication unit includes a high pressure motor, a high pressure pump and a high pressure oil line. The high pressure motor drives the high pressure pump, which pumps high pressure lubricating oil into the high pressure oil line.

Further, the high pressure oil line is used for lubricating connecting rod bearing bushes and crosshead bearing bushes in the plunger pump.

Further, the low pressure lubrication unit includes a low pressure motor, a low pressure pump and a low pressure oil line. The low pressure motor drives the low pressure pump, which pumps low pressure lubricating oil into the low pressure oil line.

Further, the low pressure oil line is used for lubricating crankshaft bearings, crosshead sliding rails, bearings of the reduction gearbox and gears of the reduction gearbox in the plunger pump.

Further, at oil inlets of the low pressure oil line, independent lubricating oil lines are respectively arranged for bearings of the reduction gearbox and gears of the reduction gearbox.

Further, the auxiliary power system is a diesel engine, or a gas turbine, or an electromotor.

Further, the auxiliary power system is disposed on a gooseneck of the chassis.

Further, there is a torque limiter disposed on the reduction gearbox, ensuring the torque not too large to damage the turbine engine.

Further, the turbine engine employs 100% of natural gas or diesel as fuel.

Further, the continuous high-power turbine fracturing equipment includes an air intake system, which includes air intake filters and air intake pipings, the air intake filters are connected to the air inlet of the turbine engine through the air intake pipings.

Further, the air intake filters are in V-shaped structures.

Further, the continuous high-power turbine fracturing equipment includes an exhaust system, which is connected to the exhaust port of the turbine engine.

Further, there is a rain cap disposed at the exhaust end of the exhaust system, the rain cap is hinged to the exhaust end of the exhaust system and an opening of the rain cap diverges from the turbine engine.

Further, after obtaining the power provided by an electric capstan, the rain cap rotates along the exhaust end of the exhaust system with a rotation angle between 0° and 90°.

Further, the rotation angle of the rain cap is 85°.

Compared with the prior art, the present invention has the following beneficial effects: providing a continuous high-power turbine fracturing equipment, in which chassis T1 materials are selected to provide a stable working platform for the equipment; the turbine engine is arranged coaxially with the reduction gearbox, the transmission shaft is disposed between the reduction gearbox and the plunger pump, and the angle between an axis of the reduction gearbox and the transmission shaft is between 2° and 4°, ensuring stable and efficient transmission of the turbine engine, thus reducing the incidence of failure; a lubrication system is driven by an auxiliary power system to ensure that the turbine engine, the reduction gearbox and the plunger pump all run under appropriate circumstances, and a dual lubrication system ensures that the plunger pump achieves a power operation continuously at 5000 HP or above; with all the above technical means, the requirements of continuous high-power operations for the fracturing equipment would finally be satisfied.

The present invention will be illustrated in detail below with reference to accompanying drawings and the detailed description.

Wherein, 1. chassis, 2. auxiliary power system, 3. the first hydraulic pump, 4. exhaust system, 5. air intake system, 6. turbine engine, 7. reduction gearbox, 8. transmission shaft, 9. plunger pump, 10. air intake filters, 11. rain cap, 12. electric capstan, 13. connecting rod bearing bushes, 14. crosshead bearing bushes, 15. crankshaft bearings, 16. crosshead upper sliding rails, 17. crosshead lower sliding rails, 18. reduction gearbox gear pair, 19. bearing of reduction gearbox, 20. high pressure oil line, 21. low pressure oil line, 22. torque limiter, 23. high pressure pump, 24. high pressure motor, 25. low pressure pump, and 26. low pressure motor.

DESCRIPTION OF THE EMBODIMENTS

Figure 1:
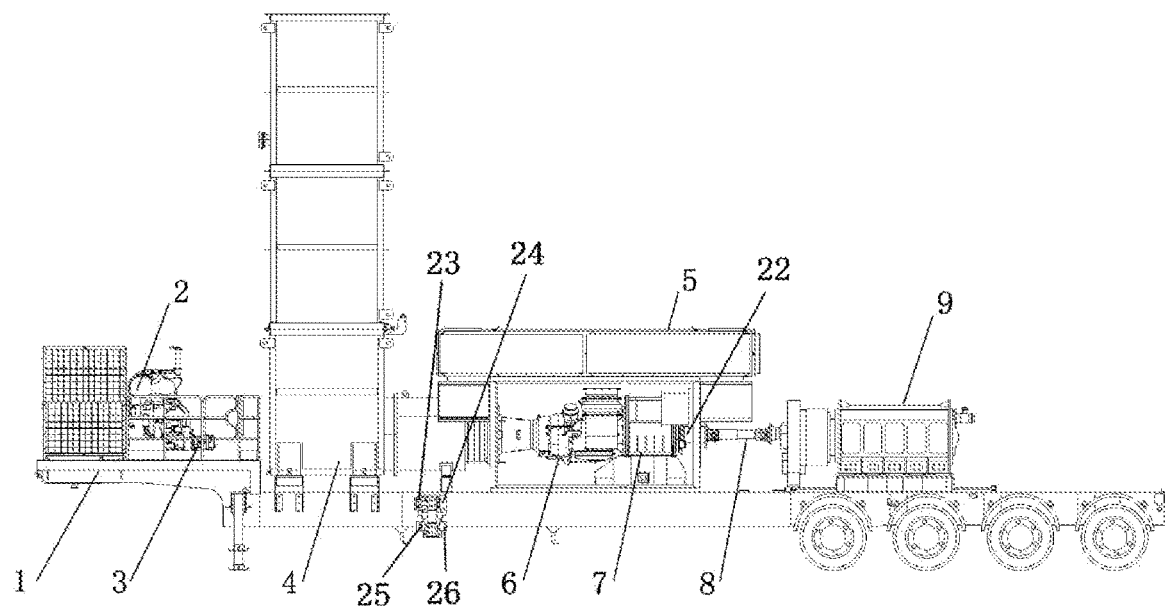
FIG. 1 is a schematic structural diagram of a continuous high-power turbine fracturing equipment.
Figure 2:
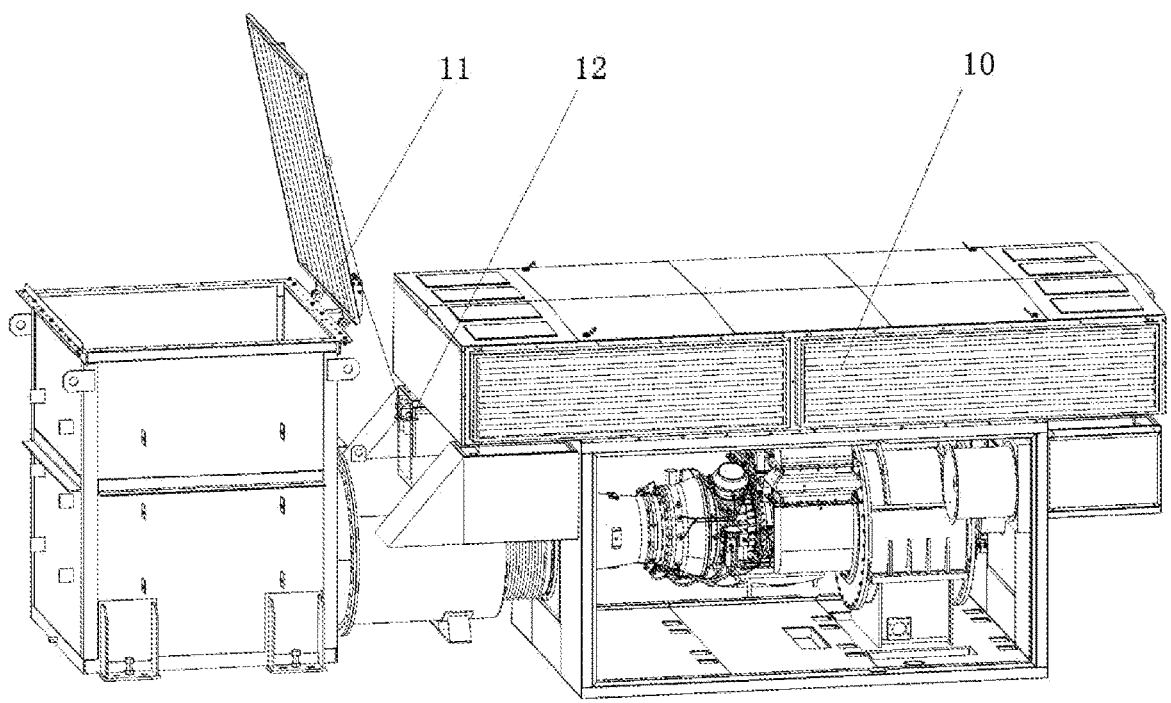
FIG. 2 is a schematic structural diagram of an exhaust system.
Figure 3:
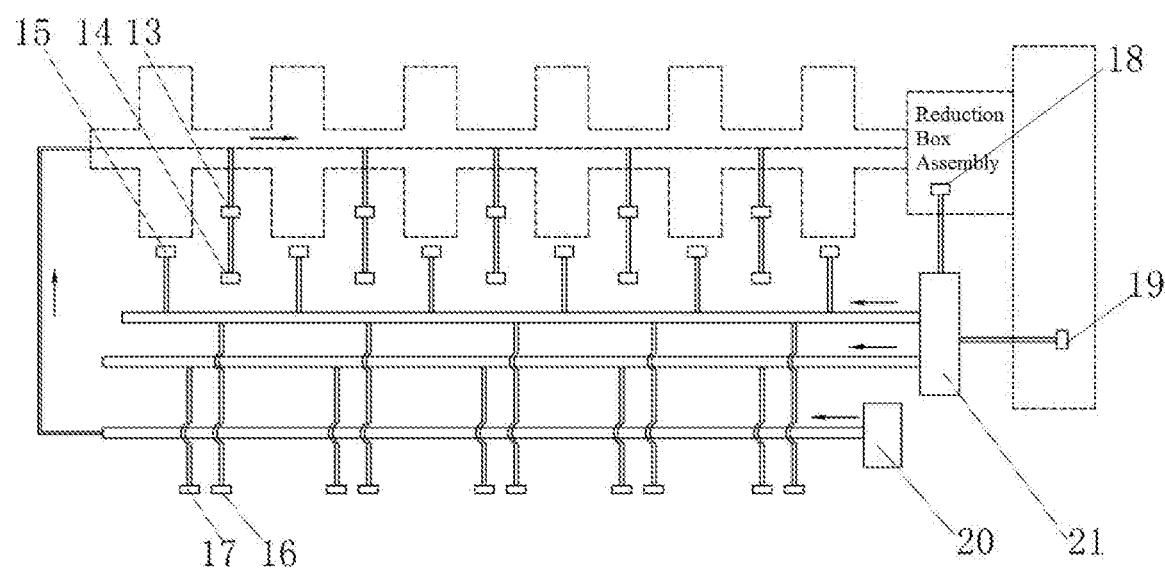
FIG. 3 is a schematic diagram of lubrication in the plunger pump.

As shown in FIGS. 1 to 3, a continuous high-power turbine fracturing equipment, including a turbine engine 6, a reduction gearbox 7, a transmission shaft 8 and a plunger pump 9, the turbine engine 6 is arranged coaxially with the reduction gearbox 7, the reduction gearbox 7 is connected to the plunger pump 9 through the transmission shaft 8, and the angle between an axis of the reduction gearbox and the transmission shaft 8 is between 2° and 4°, ensuring stable and efficient transmission of the turbine engine 6, thus reducing the incidence of failure.

The power of the plunger pump 9 is 5000 HP or above. The plunger pump 9 is a five-cylinder plunger pump. The output of the high-power plunger pump 9 provides basic conditions for the continuous high-power turbine fracturing equipment.

The continuous high-power turbine fracturing equipment includes a chassis 1, the turbine engine 6, the reduction gearbox 7, the transmission shaft 8 and the plunger pump 9 are disposed on the chassis 1. T1 high strength structure steel is employed as the material of the chassis 1, ensuring the stability of the chassis 1, providing a reliable working platform for the stable operations of the turbine engine 6 and the high-power plunger pump 9.

The number of axles of the chassis 1 is 3 or above, ensuring sufficient supporting capacity.

The continuous high-power turbine fracturing equipment includes an auxiliary power system 2 and a lubrication system, the auxiliary power system 2 provides power to the lubrication system. The lubrication system includes three lubrication units, which are the lubrication unit for the turbine engine, the lubrication unit for the reduction gearbox and the lubrication unit for the plunger pump, respectively.

The lubrication unit for the turbine engine is used for lubricating the turbine engine 6, the lubrication unit for the reduction gearbox is used for lubricating the reduction gearbox 7, and the lubrication unit for the plunger pump includes a high pressure lubrication unit and a low pressure lubrication unit. The function of the lubrication system is to lubricate and cool the turbine engine 6, the reduction gearbox 7, and the plunger pump 9, thus ensuring their stable operations. The lubrication system includes components such as a cooler, a first hydraulic pump 3, a pressure gage, a safety valve, and so on. The cooler cools the lubricating oil, ensuring the oil entering each lubrication unit at normal temperature to provide sufficient lubricating properties. The first hydraulic pump 3 provides power to each lubrication unit. The pressure gage is used to monitor the pressure of the lubricating oil in the whole lubrication system. The safety valve ensures stable operations of the lubrication system.

The high pressure lubrication unit includes a high pressure motor, a high pressure pump and a high pressure oil line 20. The high pressure motor drives the high pressure pump, which pumps high pressure lubricating oil into the high pressure oil line 20. The high pressure oil line 20 is used for lubricating connecting rod bearing bushes 13 and crosshead bearing bushes 14 in the plunger pump 9. The low pressure lubrication unit includes a low pressure motor, a low pressure pump and a low pressure oil line 21. The low pressure motor drives the low pressure pump, which pumps low pressure lubricating oil into the low pressure oil line 21. The low pressure oil line 21 is used for lubricating crankshaft bearings 15, crosshead sliding rails, bearings 19 of the reduction gearbox and gears 18 of the reduction gearbox in the plunger pump 9. The crosshead sliding rails include crosshead upper sliding rails 16 and crosshead lower sliding rails 17. By providing oil for lubrication with the dual lubricating oil line, different lubrication demands at each lubricating point in the plunger pump 9 would be satisfied; two oil pumps (a high pressure pump and a low pressure pump) are employed to supply oil so that the oil supply of each oil line could be better guaranteed, thus better distributing the lubricating oil, and avoiding problems of uneven distribution of lubricating oil caused by excessive lubrication branches and insufficient amount of lubricating oil at each lubricating point, thus enhancing the utilization of lubricating oil, reducing abnormalities, and better assisting the continuous stable operations of the high-power plunger pump 9. For the connecting rod bearing bushes 13 and the crosshead bearing bushes 14, the fit clearance is small, the carried load is high, the contact area is large, and the requirements on lubrication are high. However, for the crankshaft bearings 15, the crosshead sliding rails, bearings 19 of the reduction gearbox and gears 18 of the reduction gearbox, by contrast, the requirements on lubrication are low.

At an oil inlet of the low pressure oil line 21, independent lubricating oil lines are respectively arranged for bearings 19 of the reduction gearbox and gears 18 of the reduction gearbox. The rotation rates of the bearings 19 of the reduction gearbox and the gears 18 of the reduction gearbox are high, each of which is supplied with oil independently, which can guarantee sufficient lubricating oil for effectively establishing oil films, rapidly taking away the heat resulting from friction, and improving the life time.

There is a filter, an overflow valve and the like disposed on the respective oil supply line of the high pressure oil line 20 and the low pressure oil line 21. The rated lubricating oil pressure of the high pressure oil line 20 is 200-350 PSI. The rated lubricating oil pressure of the low pressure oil line 21 is 60-150 PSI.

The auxiliary power system 2 is a diesel engine, or a gas turbine, or an electromotor.

The auxiliary power system 2 is disposed on a gooseneck of the chassis 1, optimizing the configuration form of each component of the equipment on the chassis 1.

There is a torque limiter disposed on the reduction gearbox 7, ensuring the torque not too large to damage the turbine engine 6.

The turbine engine 6 employs 100% of natural gas or diesel as fuel.

The continuous high-power turbine fracturing equipment includes an air intake system 5, which includes air intake filters 10 and air intake pipings, the air intake filters 10 are connected to the air inlet of the turbine engine 6 through the air intake pipings. The air intake system 5 is integrated on the same chassis 1, increasing the ease of use of the continuous high-power turbine fracturing equipment, reducing the transportation cost, without the need of field connection and assembly.

A chamber is disposed outside the turbine engine 6, the air intake filters 10 are disposed on the chamber, and the air intake filters 10 are in V-shaped structures, which means that the cross sections of the air intake filters 10 are in V-shapes, which are different from the existing planar structures in larger contact area, thus increasing the air intake area, decreasing the flow rate of the air inflow, extending the life time of the air intake filters 10, better matching the desired air amount of the turbine engine 6, and promoting the stable output of the turbine engine 6.

The continuous high-power turbine fracturing equipment includes an exhaust system 4, which is connected to the exhaust port of the turbine engine 6. The exhaust system 4 is integrated on the same chassis 1, increasing the ease of use of the continuous high-power turbine fracturing equipment, reducing the transportation cost, without the need of field connection and assembly.

The exhaust end of the exhaust system 4 is provided with a rain cap 11, the rain cap is hinged to the exhaust end of the exhaust system 4 and the opening of the rain cap diverges from the turbine engine 6. The exhaust end of the exhaust system 4 is in a type of opening, if it rains, the rainwater would accumulate in the exhaust system 4, more seriously flow backward into and damage the turbine engine 6. The addition of rain cap 11 can effectively avoid this. Moreover, the opening of rain cap 11 diverges from the turbine engine 6, thus preventing the discharged exhaust from being inhaled by the air intake system 5 of the turbine engine 6.

After obtaining the power provided by an electric capstan 12, the rain cap 11 rotates along the exhaust end of the exhaust system 4 with a rotation angle between 0° and 90°. The rotation angle of the rain cap 11 is 85°. The rain cap 11 can be completely closed in non-working state or on rainy days, that is 0° status; and can be opened in working state, preferably open up to 85°, ensuring that the rain cap 11 can be opened and closed smoothly by the electric capstan 12.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A continuous high-power turbine fracturing equipment, comprising a turbine engine, a reduction gearbox, a transmission shaft and a plunger pump, the turbine engine is arranged coaxially with the reduction gearbox, the reduction gearbox is connected to the plunger pump through the transmission shaft, and; and
    wherein the continuous high-power turbine fracturing equipment comprises an auxiliary power system and a lubrication system, the auxiliary power system provides power to the lubrication system, the lubrication system comprises a lubrication unit for the turbine engine, a lubrication unit for the reduction gearbox and a lubrication unit for the plunger pump, the lubrication unit for the plunger pump comprises a high pressure lubrication unit and a low pressure lubrication unit; and
    wherein the low pressure lubrication unit comprises a low pressure motor, a low pressure pump and a low pressure oil line, the low pressure motor drives the low pressure pump, which pumps low pressure lubricating oil into the low pressure oil line; and
    wherein the low pressure oil line is used for lubricating crankshaft bearings, crosshead sliding rails, bearings of the reduction gearbox and gears of the reduction gearbox in the plunger pump; and
    wherein at an oil inlet of the low pressure oil line, independent lubricating oil lines are respectively arranged for the bearings of the reduction gearbox and the gears of the reduction gearbox.

2. The continuous high-power turbine fracturing equipment according to claim 1, wherein the auxiliary power system is a diesel engine, or a gas turbine, or an electromotor.

3. The continuous high-power turbine fracturing equipment according to claim 1, wherein the auxiliary power system is disposed on a gooseneck of the chassis.

4. The continuous high-power turbine fracturing equipment according to claim 1, wherein the turbine engine employs 100% of natural gas or diesel as fuel.

5. The continuous high-power turbine fracturing equipment according to claim 1, wherein the continuous high-power turbine fracturing equipment comprises a chassis, the turbine engine, the reduction gearbox, the transmission shaft and the plunger pump are disposed on the chassis, and T1 high strength structure steel is employed as the material of the chassis.

6. The continuous high-power turbine fracturing equipment according to claim 5, wherein the number of axles of the chassis is 3 or above.

7. The continuous high-power turbine fracturing equipment according to claim 1, wherein the high pressure lubrication unit comprises a high pressure motor, a high pressure pump and a high pressure oil line, the high pressure motor drives the high pressure pump, which pumps high pressure lubricating oil into the high pressure oil line.

8. The continuous high-power turbine fracturing equipment according to claim 7, wherein the high pressure oil line is used for lubricating connecting rod bearing bushes and crosshead bearing bushes in the plunger pump.

9. The continuous high-power turbine fracturing equipment according to claim 1, wherein the power of the plunger pump is 5000 HP.

10. The continuous high-power turbine fracturing equipment according to claim 9, wherein the plunger pump is a five-cylinder plunger pump.

11. The continuous high-power turbine fracturing equipment according to claim 1, wherein the continuous high-power turbine fracturing equipment comprises an air intake system, which comprises air intake filters and air intake pipes, the air intake filters are connected to air inlets of the turbine engine through the air intake pipes.

12. The continuous high-power turbine fracturing equipment according to claim 11, wherein the air intake filters are in V-shaped structures.

13. The continuous high-power turbine fracturing equipment according to claim 1,
 wherein the continuous high-power turbine fracturing equipment comprises an exhaust system, which is connected to an exhaust port of the turbine engine; and
 wherein an exhaust end of the exhaust system is provided with a rain cap, the rain cap is hinged to the exhaust end of the exhaust system and an opening of the rain cap diverges from the turbine engine; and
 after obtaining the power provided by an electric capstan, the rain cap rotates along the exhaust end of the exhaust system with a rotation angle between 0° and 90°.

14. The continuous high-power turbine fracturing equipment according to claim 13, wherein the rotation angle is 85°.

* * * * *